(12) United States Patent
Powell et al.

(10) Patent No.: US 7,540,068 B2
(45) Date of Patent: Jun. 2, 2009

(54) SIDE HANDLE FOR A HAND TOOL

(75) Inventors: Dennis Powell, Elk Grove Village, IL (US); Mark Heintz, Glen Ellyn, IL (US); Ivan Guo, Wheeling, IL (US); P. Sean Gallagher, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 538 days.

(21) Appl. No.: 11/170,340

(22) Filed: Jun. 29, 2005

(65) Prior Publication Data

US 2007/0000093 A1   Jan. 4, 2007

(51) Int. Cl.
*B25G 1/00* (2006.01)
(52) U.S. Cl. .......................... 16/426; 16/430
(58) Field of Classification Search ................. 16/441, 16/431, 430, 426, DIG. 12, DIG. 19; 83/427; 81/489
See application file for complete search history.

(56) References Cited

U.S. PATENT DOCUMENTS

| | | | |
|---|---|---|---|
| 2,534,001 A | 12/1950 | Couse | |
| D180,708 S | 7/1957 | Bruck | |
| 2,906,304 A | 9/1959 | Levine | |
| D194,736 S | 2/1963 | Godfrey | |
| 3,155,128 A | 11/1964 | Godfrey et al. | |
| 3,336,703 A * | 8/1967 | Multer | 451/344 |
| 4,938,642 A * | 7/1990 | Imahashi et al. | 409/182 |
| 5,049,012 A | 9/1991 | Cavedo | |
| D322,921 S | 1/1992 | Bosten et al. | |
| 5,269,045 A * | 12/1993 | DeSerio et al. | 16/422 |
| 5,725,422 A * | 3/1998 | Leweck | 451/359 |
| 6,065,912 A * | 5/2000 | Bosten et al. | 409/134 |
| 6,266,850 B1* | 7/2001 | Williams et al. | 16/430 |
| 6,443,676 B1* | 9/2002 | Kopras | 409/182 |
| 6,854,938 B2* | 2/2005 | Kopras et al. | 409/182 |
| 7,089,978 B2* | 8/2006 | Karkosch et al. | 144/136.95 |
| 7,131,180 B2* | 11/2006 | Kopras et al. | 29/560 |
| 2004/0163214 A1 | 8/2004 | Cheng | |
| 2005/0025599 A1* | 2/2005 | Kopras et al. | 409/182 |

* cited by examiner

*Primary Examiner*—Victor Batson
*Assistant Examiner*—Jeffrey O'Brien
(74) *Attorney, Agent, or Firm*—Greer, Burns & Crain, Ltd.

(57) ABSTRACT

A side handle for a hand tool having a foot structure includes a support structure having a base end portion and an outer end portion, an adjustable gripable member extending from the outer end portion, and means for removably securing the support structure to the foot structure of the hand tool.

12 Claims, 5 Drawing Sheets

SIDE HANDLE FOR A HAND TOOL

BACKGROUND OF THE INVENTION

The present invention generally relates to power hand tools of the type which have a foot structure. More particularly, the present invention relates to an adjustable side handle for such a power hand tool.

Power hand tools having foot structures, such as jigsaws, saber saws, circular saws, reciprocating saws and the like, are commonly used in construction and home maintenance by both professionals and laymen. These tools are generally portable and relatively lightweight, and allow the operator to use them in a variety of locations.

However, many current hand tools can be awkward to handle because of their shape, and can be difficult to properly maneuver depending on the material on which they are used. For instance, although the foot structure of the hand tool is designed to assist the operator in making straight and accurate cuts, it can still be difficult to control the direction of the tool during operation.

Although most hand tools have handles for the operator to grip during tool operation, they generally do not provide enough stability to the tool. Because much of the operator's force is placed on the handle, especially if the handle also includes a trigger for activating the tool, the tool can become unbalanced and create inaccurate cuts. Also, during operation, the tool vibrates as the blade cuts through the cutting material, which can also contribute to inaccurate cuts and increase the chances of injury to the operator.

To try and combat these problems, auxiliary handles have been developed that attach to the hand tool and act to stabilize the tool during operation. However, these handles are generally bulky and uncomfortable to use. Some current auxiliary handles have more complicated designs that can be difficult for a layman to use and properly attach to the tool. Many of these auxiliary handles are generally not adjustable, and require special tools to attach and remove them from the tool. Because they are generally not adjustable, it can be difficult for left-handed operators to utilize the handle. Also, if the tool needs to operate against a wall or in some other confined space, it may be difficult to attach the auxiliary handle if the side having the attachment mechanism is inaccessible.

Therefore, there exists a need for an auxiliary handle that can help maintain the balance and accuracy of the hand tool during operation. There also exists a need for an auxiliary handle that is adjustable and can easily be used by both laymen and professionals alike. Finally, there exists a need for an auxiliary handle that can easily be moved from one side of the foot structure to the other, facilitating easy use by both left-handed and right-handed operators, and allowing both sides of the foot structure to act as an attachment mechanism for the handle.

SUMMARY OF THE INVENTION

The preferred embodiment of the present invention is directed to a side handle for a hand tool having a foot structure and includes a support structure having a base end portion and an outer end portion, an adjustable gripable member extending from the support structure, and means for removably securing the support structure to the foot structure of the hand tool.

DETAILED DESCRIPTION OF THE INVENTION

Embodiments of the present side handle are designed to maintain balance of a power hand tool such as a jigsaw during operation, and can be easily attached to and removed from the tool without the use of special tools. Further, the preferred embodiment of the side handle is configured for attachment to either side of the foot structure of a tool, thereby facilitating use by both left-handed and right-handed operators. Because the present handle can be attached to either side of the foot structure, the handle can still be utilized in a small space, such as when one side of the tool abuts against a wall. The handle is adjustable and can be oriented to meet the comfort and needs of the operator.

Figure 1:
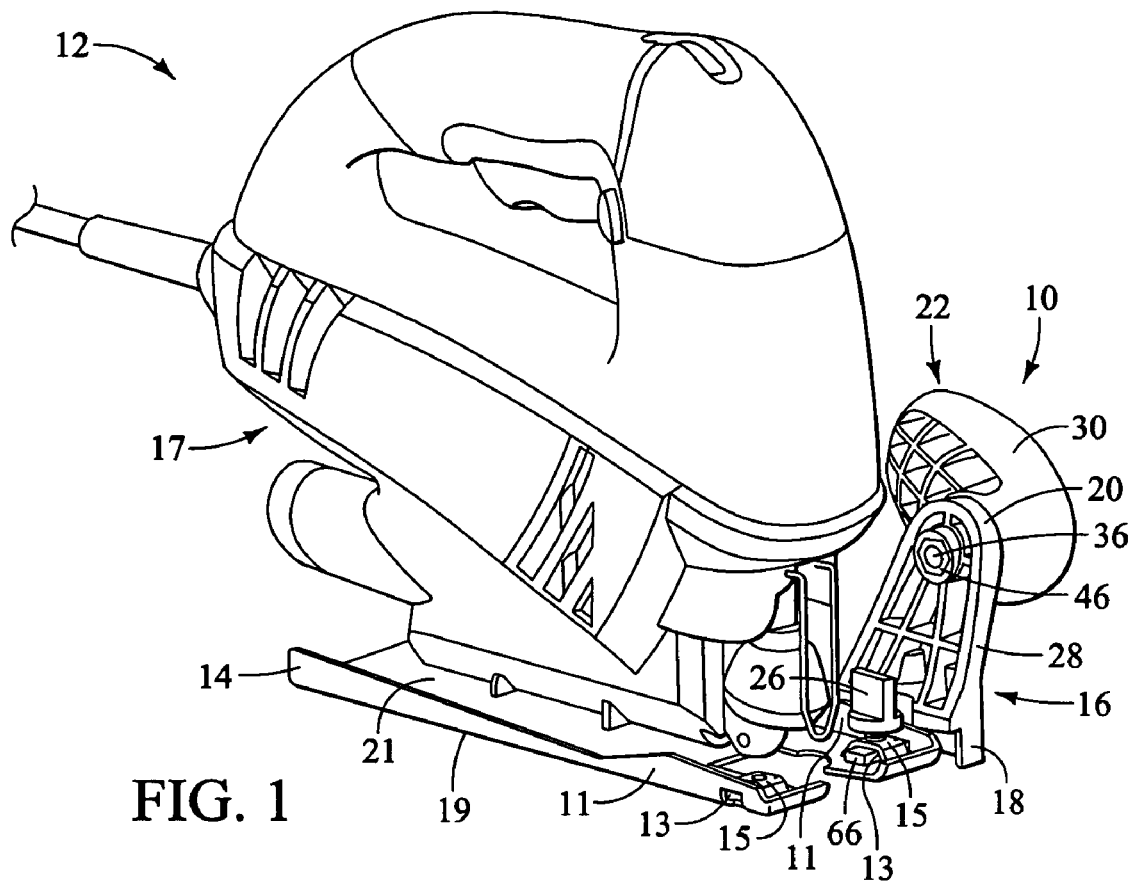
FIG. 1 is a perspective view of a jigsaw having the preferred embodiment of the side handle attached to the left side of a foot structure of the jigsaw as viewed from the back of the jigsaw.
Figure 2:
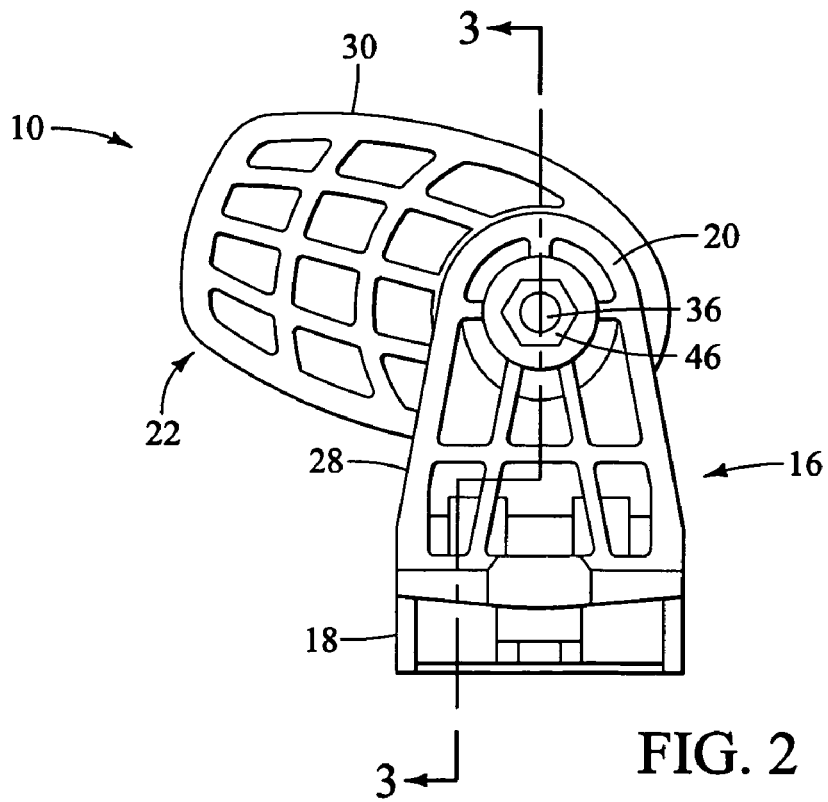
FIG. 2 is a right side view of the side handle shown in FIG. 1.
Figure 3:
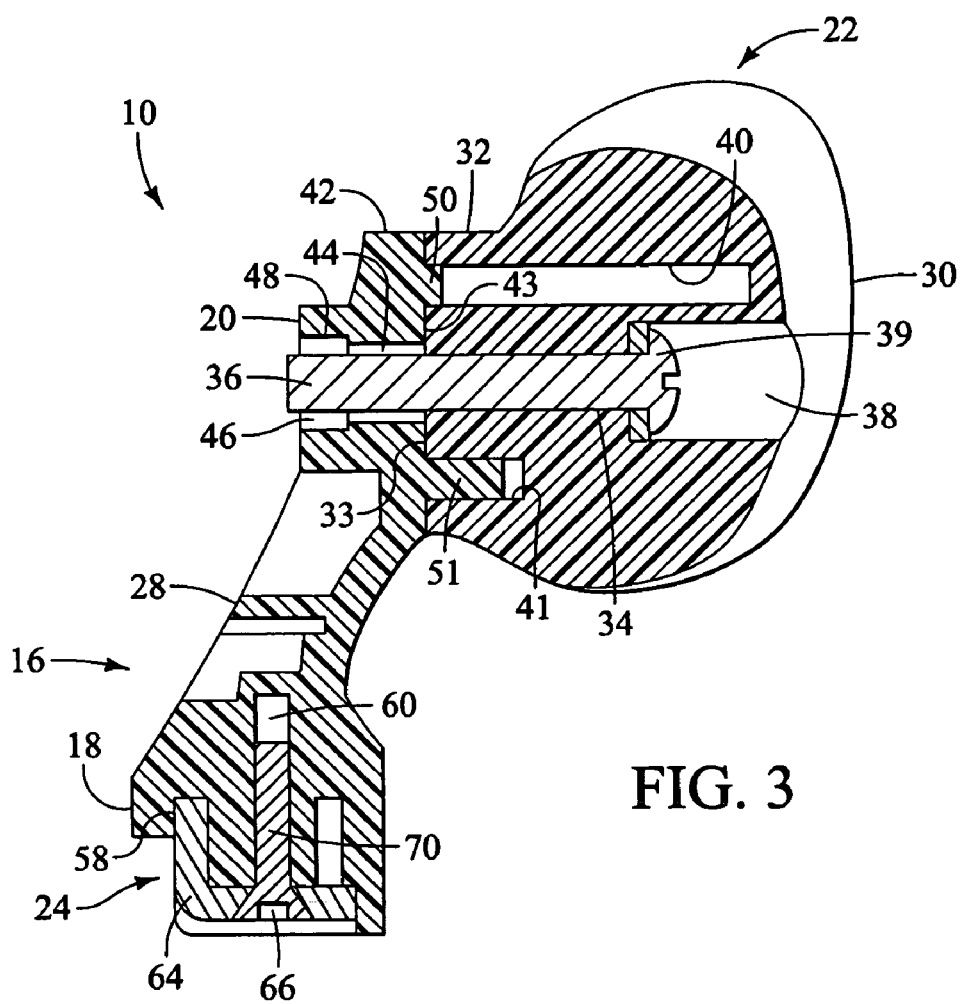
FIG. 3 is a cross section of the side handle taken generally along line 3-3 of FIG. 2.

Turning now to the drawings, and particularly FIG. 1, the side handle of the present invention is generally designated 10, and is configured for attachment to a jigsaw 12 having a foot structure 14 which is detachable from a tool body indicated generally at 17. As shown in FIGS. 1 and 3, the side handle 10 generally includes a support structure, indicated generally at 16, having a base end portion 18 and an outer end portion 20, a gripable member, in this case an adjustable control knob, indicated generally at 22, extending from the outer end portion, a mounting portion extending from said base end portion 18 and configured for removable attachment to the foot structure of the hand tool, in this case comprising a bracket 24 configured for attachment to the base end portion of the support structure, and a threaded knob 26 configured for removably securing the mounting bracket 24 to the hand tool.

Figure 5:
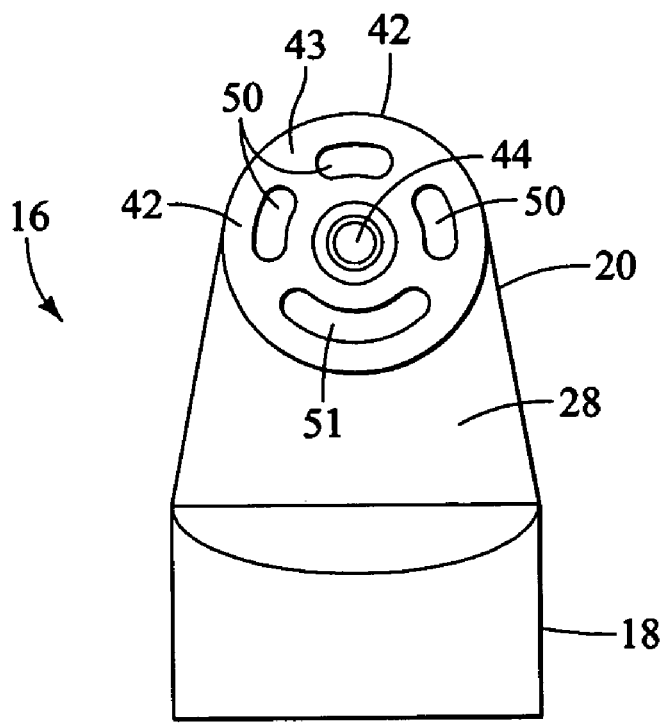
FIG. 5 is a left side view of the support structure of the side handle shown in FIG. 1.

Referring to FIGS. 1, 3 and 5, the support structure 16 includes a middle portion 28 connecting the base end portion 18 and the outer end portion 20. The middle portion 28 is configured to extend outwardly from the hand tool 10 and the base end portion 18. By extending the middle portion 28 outwardly from the hand tool 10, the operator can easily access the control knob 22 without interfering with the jigsaw. In the preferred embodiment, the support structure 16 is preferably injection molded of ABS plastic, although other methods of manufacture and materials can be used, as are known in the art.

In the preferred embodiment, shown in FIG. 3, the control knob 22 is removably attached to the outer end portion 20 of the support structure 16 and includes a generally oval-shaped main portion 30 and a short, generally cylindrical portion 32 extending from the oval-shaped portion defining a circular end face 33 of the generally cylindrical portion. The oval-shaped portion 30 is ergonomical and allows the operator to comfortably maintain a grip on the control knob 22 during operation of the tool 10. However, it should be appreciated that other shapes or configurations of the current knob 22 are possible. For example, it is recognized that different sizes or shapes of the control knob 22 could be provided. In addition, it is possible that a comfort or soft grip could be added to or formed in the exterior surface of the control knob 22, making it easier for the user to grip the control knob.

The control knob 22 further includes a generally centrally located through hole 34 configured for receiving a screw 36. A larger diameter portion 38 of the control knob through hole 34 is sized to hold a head 39 of the screw 36 and is configured to receive a tool (not shown) for tightening and loosening of the screw (FIG. 3). The portion 38 allows easy accessibility to the screw 36, so that it can quickly and easily be tightened or loosened by the operator.

Figure 4:
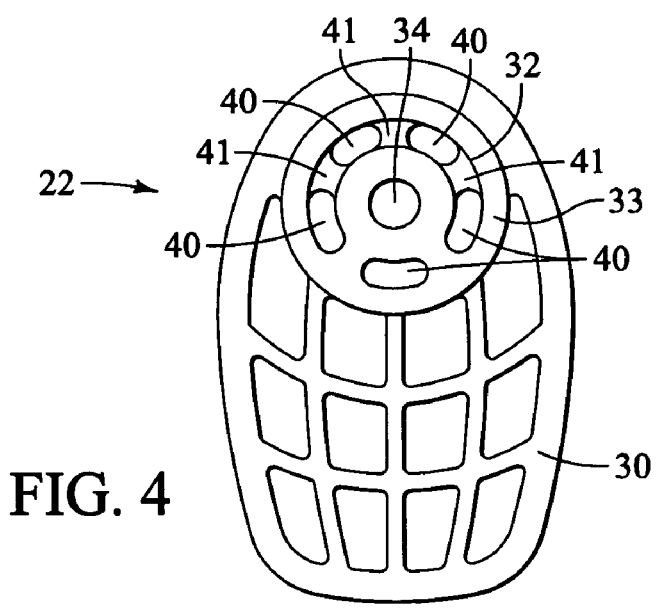
FIG. 4 is a right side view of the control knob of the side handle shown in FIG. 1.

As is best shown in FIGS. 3 and 4, the circular face 33 of the control knob cylindrical portion 32 also includes a plurality of spaced shallow arcuate openings 40 located around the generally centrally located through hole 34 and having varying depths. The plurality of openings 40 are configured to aid in the adjustability of the control knob 22, which will be hereinafter discussed in detail. In the preferred embodiment, the control knob 22 is preferably injection molded from ABS plastic, as is known in the art, but other methods of manufacture and material can be used.

Also shown in FIGS. 3 and 4 are deep arcuate openings 40 found between certain smaller arcuate openings 41 and extending deeper into the control knob 22 than the spaced arcuate openings 41. The combination of the deep arcuate openings 40 and the shallow arcuate openings 41 yields an arcuate channel of at least a minimum depth traversing the arc defined by the topmost four shallow arcuate openings of FIG. 4. The deep arcuate openings 40 are deeper than the shallow arcuate openings 41 not for the functional reasons defined below, but rather to facilitate manufacture of the control knob 22.

With regard to the support structure 16 and referring to FIGS. 3 and 5, the outer end portion 20 of the support structure 16 includes a generally circular front portion 42 wherein a circular face 43 for alignment with the circular face 33 of the control knob circular portion 32. The support structure circular front portion 42 further includes a generally centrally located through hole 44 configured for alignment with the control knob circular portion centrally located through hole 34.

After the screw 36 passes through the control knob through hole 34 and the support structure circular front portion through hole 44, it is configured for threadably receiving a nut 46, where the nut is configured for insertion into a large diameter portion 48 of the circular front portion through hole 44 (FIG. 3). It should also be appreciated that rather than being a separate component of the side handle 10, the nut 46 could be insert molded into the large diameter portion 48 of the circular front portion through hole 44. However, the nut 46 of the present side handle 10 is not limited to the two possibilities stated herein.

Extending from the circular face 43 of the outer end circular front portion 42 of the support structure 16 are a plurality of arcuate protrusions 50 and 51 spaced around through hole 44 in the circular front portion with the protrusions having varying depths. There are several smaller arcuate protusions 50 and one larger arcuate protrusion 51. The protrusions 50 are configured to fit in the openings 40 while the protrusion 51 is configured to fit in the arcuate channel defined by the topmost three shallow arcuate portions 41 and four deep arcuate openings 40 of FIG. 4, and provide a second means of attachment between the control knob 22 and the outer end portion 20 of the support structure 16. However, it should be appreciated that other methods are available for attaching the support structure 16 to the control knob 22, such as a snap-fit or tongue-and-groove attachment, as are known in the art.

The plurality of protrusions 50 and 51 and openings 40 and 41 are configured to facilitate rotation or adjustment of the control knob 22 with respect to the support structure 16, although it should be appreciated that other configurations may be available. Specifically, the control knob 22 is configured to be placed in three rotational positions that span a total range of 140° with respect to the support structure 16, although other ranges and numbers of angular positions may be possible.

In order to adjust the handle, the operator must first loosen screw 36, which will loosen the attachment between the control knob 22 and the support structure 16. Loosening the screw 36 will also disengage the protrusions 50 and 51 from their corresponding openings 40 and 41. Once the control knob 22 is disengaged from the support structure 16, it can be rotated to fit the next set of corresponding protrusions 50 and 51 and openings 40 and 41. In particular, there are three rotational positions wherein the lowermost opening 40 of FIG. 4 cooperates with a different one of the arcuate protrusions 50 of FIG. 5. This function allows the operator to adjust the control knob 22 based on comfort and operating needs. Because there is no need for special tools in this procedure, the control knob 22 can be quickly and easily adjusted by professional contractors and laymen alike. Although one method of adjusting the control knob 22 relative to the support structure 16 has been herein described, it should be appreciated that other adjustment methods are available, such as a ratcheting configuration or other arrangement known in the art.

Figure 6:
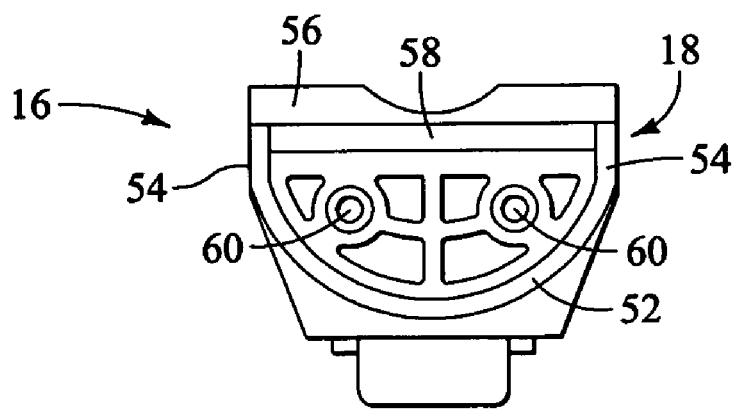
FIG. 6 is a bottom view of a base end portion of the support structure of the side handle shown in FIG. 1.

As shown in FIG. 6, the base end portion 18 of the support structure 16 includes a rounded portion 52, a pair of straight sidewall portions 54 located on either end of the rounded portion, and a generally straight front edge 56 connecting the sidewall portions. In the preferred embodiment, the straight front edge 56 is arranged parallel to the longitudinal axis of the foot structure 14, and is configured to abut against the foot structure (FIG. 1), although it should be recognized that other arrangements are possible that would maintain a stable configuration, as known in the art. The base end portion 18 further includes at least one slot-shaped opening 58 arranged parallel to the generally straight front edge 56, and at least one pair of through holes 60.

Figure 7:
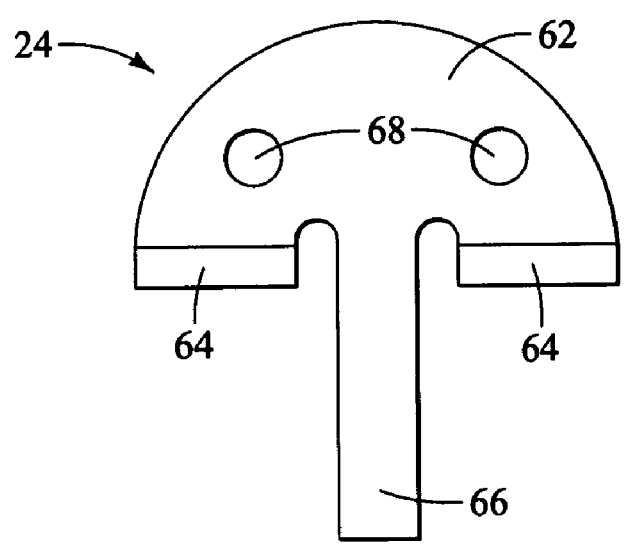
FIG. 7 is a top view of a mounting bracket of the side handle shown in FIG. 1.
Figure 8:
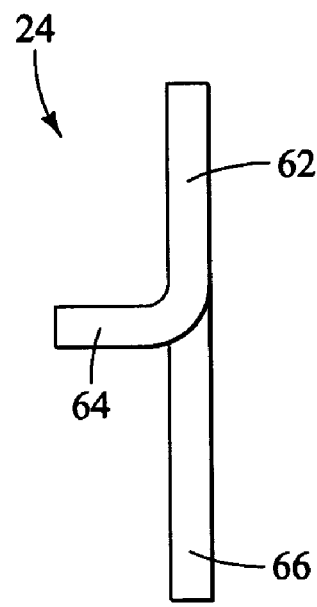
FIG. 8 is a side view of the mounting bracket of FIG. 7.
Figure 9:
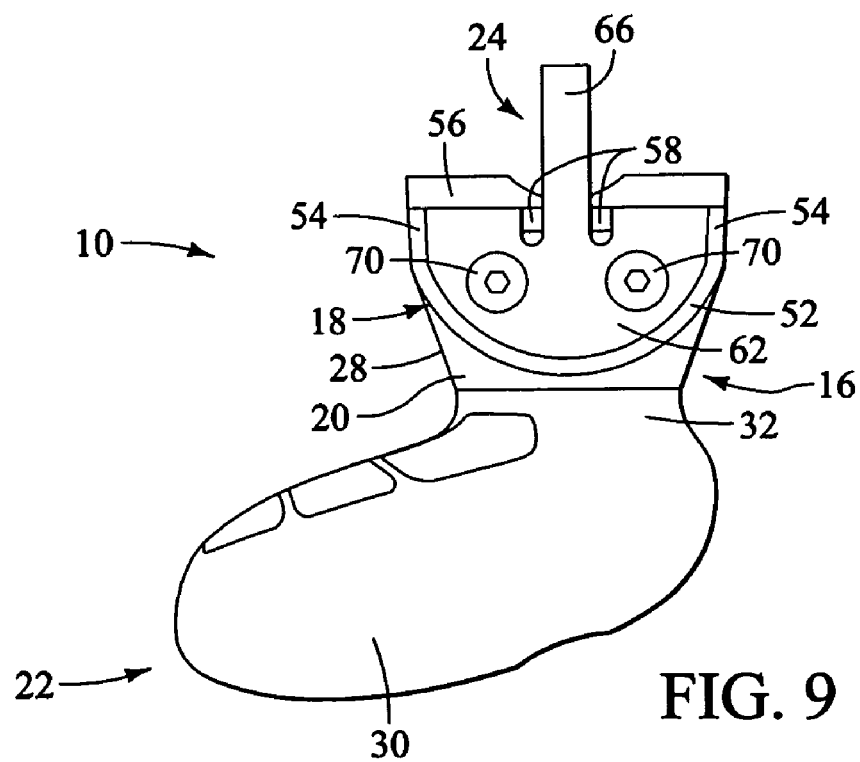
FIG. 9 is a bottom view of the side handle of FIG. 2.

Referring to FIGS. 7-9, the mounting bracket 24 is configured for connection to both the foot structure 14 and the support structure 16 and includes a rounded portion 62, at least one lip portion 64 connected to the rounded portion and extending upwardly from the mounting bracket, and a tongue portion 66 extending laterally outward from the rounded portion. As shown in FIG. 9, the mounting bracket rounded portion 62 is configured to be received by the rounded portion 52 of the base end portion 18. Although the present embodiment features rounded portions of the mounting bracket 24 and the base end portion 18, it should be recognized that other shapes are possible, as are known in the art.

Figure 10:
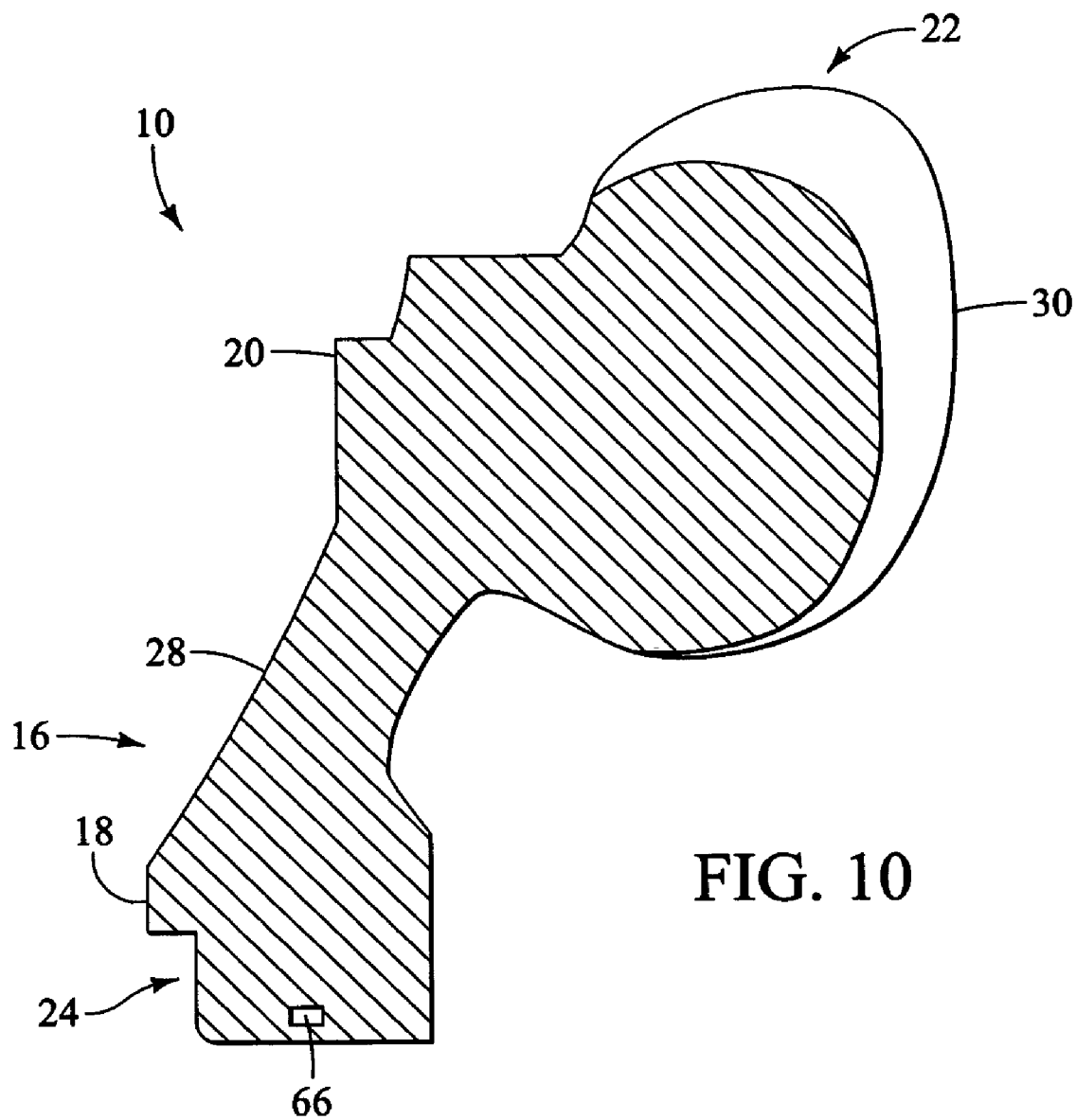
FIG. 10 is a cross section, similar to FIG. 3, of an alternative embodiment of a side handle.

To secure the mounting bracket 24 to the base end portion 18, the mounting bracket further includes at least one pair of through holes 68 configured for alignment with the at least one pair of base end portion through holes 60. The mounting bracket through holes 68 and the base end portion through holes 60 are configured to receive at least one pair of screws 70. In the present invention, the screws 70 are steel flathead screws with a black oxide finish, although it is appreciated that other types of screws are available, as known in the art. Although one method for securing the mounting bracket 24 to the base end portion 18 has been featured, it should be appreciated that other methods of attachment are available, such as a snap-fit or sliding relationship between the mounting bracket and the base end portion, both of which are known in the art. In addition, it is possible that the support structure 16 and the mounting bracket 24 could be secured together by more permanent methods, such as plastic welding or ultrasonic welding, as are also known in the art, such that the mounting bracket 24 is integral with the support structure 16 as shown in the alternative embodiment of FIG. 10. In addition, the term integral also encompasses forming the mounting bracket 24 with the support structure 16 by molding plastic or plastic-like material. Also, metal can be molded or otherwise formed into the desired shape and would also be considered to be integral. In similar manner, the support structure may be integral with the control knob 22, as is also shown in the alternative embodiment of FIG. 10. It should be understood that the alternative embodiment may have the support structure 16 being integral with only one of the mounting bracket 24 or the control knob 22. It is contemplated that these methods may reduce the manufacturing costs of the side handle 10, because there would be no need for screws or other separate methods of attachment.

To further secure the mounting bracket 24 to the base end portion 18, each lip portion 64 corresponds to and is configured for insertion into the slot-shaped opening 58 of the base end portion (FIG. 3). The combination of the lip portion 64 inserted into the slot-shaped opening 58 and the use of the screws 70 to fasten the mounting plate 24 to the base end portion 18 provides a stable and secure connection between the mounting bracket and the support structure 16. Because of these secure connections, the side handle 10 should remain stable and should not vibrate or become loosened during operation of the hand tool 12. However, it should be appreciated that other additional methods may be available for providing a stable connection between the mounting bracket 24 and the base end portion 18, such as a tongue-and-groove configuration, for example.

The tongue portion 66 of the mounting bracket 24 is configured for insertion into the foot structure 14 as shown in FIG. 1. The foot structure 14 is in this case a plate having a top surface 21 and a bottom surface 19 for bringing the tool in contact with a workpiece. Extending upwards from opposite sides of the bottom surface 19 are two lip portions 11 that are generally parallel to each other. The foot structure 14 is configured with at least one mounting portion. There may be any number of mounting portions configured within the foot structure 14. The two mounting portions in this case are mirror images of each other, lie on a common axis, and are arranged symmetrically with respect to the tool body 17. The mounting portions extend into the left and right lip portions 11 such that each lip portion 11 defines the entrance to a channel 13 for receiving the tongue portion 66 of the mounting bracket 24. The channels 13 in the present embodiment share a common central axis defined as running along the length of the channel. In the present embodiment, the channels 13 are spaced apart from each other such that the working aspect of the power tool, in this case a blade (not pictured), may work in between said spaced apart channels 13. One face of the channel 13 is configured with a through hole 15 for receiving the threaded knob 26. In the preferred embodiment the threaded knob 26 is passed through the respective through hole 15 and tightened so as to press against the tongue portion 66, securely holding the side handle 10 to the foot structure 14. This enables the threaded knob 26 to hold the side handle 10 to the foot structure 14 in a secure and stable manner, and should not loosen during operation. Furthermore, because the threaded knob 26 does not require the use of special tools to tighten or loosen the connection to the mounting plate tongue portion 66, the side handle 10 can easily be removed from or attached to the foot structure 14, and can also easily be moved from one side of the foot structure to the other, depending on the needs of the operator. It is also appreciated that the tongue portion 66 can include a through hole (not shown) that receives the threaded knob 26, thereby securing the side handle 10 to the foot structure. Although a threaded knob 26 is featured in the present embodiment, it should be recognized that other configurations are possible for attaching the knob 26 to the tongue portion 66, such as a snap-fit or spring clip, which are both known in the art.

In another possible embodiment of the present invention, the side handle 10 can consist of the support structure 16 and the mounting bracket 24 being a unitary structure, to which the control knob 22 is removably secured. The support structure 16 and the mounting bracket 24 could be injection molded from ABS plastic, or could be joined together by welding or other known methods. The control knob 22 would attach to the support structure 16 in the same manner as stated above, although it is appreciated that other methods of attachment are available.

This embodiment would still allow the control knob 22 to be removed from the support structure, because it is not integrated with the side handle 10 itself. However, this embodiment may be more practical in everyday use because it consists of fewer parts than the preferred embodiment. In addition, manufacturing the support structure 16 and the mounting bracket 24 as one structure may reduce the manufacturing costs of the side handle 10. Furthermore, it is appreciated that this embodiment, as previously stated, would allow for different shapes or sizes of the control knob 22 to be provided, depending on the needs of the user.

While various embodiments of the present side handle have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the side handle are set forth in the following 7 claims.

What is claimed is:

1. A side handle for a hand tool configured to retain a cutting blade for cutting a work piece and having a foot structure with a flat bottom surface for contacting the work piece and controlling the position of the cutting blade during operation of the tool, the foot structure having side portions adjacent to and on opposite sides of a front opening through which the cutting blade extends, said foot structure having a raised horizontal surface portion defining a narrow channel on each side portion oriented generally toward said opening and configured to receive a thin narrow elongated member therein, said surface having a threaded through hole above each of said channels, said handle comprising: a support structure having a base end portion and an outer end portion extending upwardly from the foot structure, said base end portion comprising a mounting portion, wherein said mounting portion comprises a thin narrow elongated metal member extending from said base end portion; a gripable knob member having an enlarged oval shaped main portion that merges with a smaller cylindrical portion that is rotatably attached by a first threaded member to said outer end portion at two or more distinct positions that are determined by a set of holes in one of said outer end portion and said cylindrical portion and a set of protrusions in the other of said outer end portion and said cylindrical portion that fit within said holes; and a second threaded member configured to engage said through hole to contact said elongated member for removably securing said base end portion of the support structure to the foot structure.

2. The side handle of claim 1 wherein said mounting portion is integral with said base end portion.

3. The side handle of claim 2 wherein said second threaded member comprises a threaded screw having a knob head.

4. The side handle of claim 1 wherein said mounting portion comprises a mounting bracket having a support portion configured for attachment to said base end portion.

5. The side handle of claim 4 wherein said mounting bracket includes at least one lip portion extending upwardly from said support portion.

6. The side handle of claim 5 wherein said base end portion includes at least one slot-shaped opening for receiving said lip portion of said mounting bracket.

7. The side handle of claim 1 wherein said gripable member is integral with said outer end portion.

8. The side handle of claim 1 wherein said gripable knob member is configured for removable attachment to said outer end portion.

9. The side handle of claim 8 wherein both said gripable knob member and said outer end portion include a through hole, and said first threaded member passes through said through holes to reversibly secure the gripable member to the outer end portion.

10. A side handle as defined in claim 1 wherein said set of holes and said set of protrusions are arranged in a circular configuration that is generally coextensive with one another, said set of holes being interconnected with an arcuate channel extending from one end to another end and having a depth less than the depth of said holes, the length of said protrusions enabling rotation of said knob member from one distinct position to another when said first threaded member is loosened sufficiently to withdraw from a hole but not withdraw from said arcuate channel and thereby limit rotation only between the opposite ends of said arcuate channel.

11. A side handle for a hand tool configured to retain a cutting blade for cutting a work piece and having a foot structure with a flat bottom surface for contacting the work piece and controlling the position of the cutting blade during operation of the tool, the foot structure having side portions adjacent to and on opposite sides of a front opening through which the cutting blade extends, said foot structure having a raised horizontal surface portion defining a narrow channel on each side portion oriented generally toward said opening and configured to receive a thin narrow elongated member therein, said surface having a threaded through hole above said channels, said handle comprising: a support structure having a base end portion and an outer end portion, said base end portion comprising a mounting portion, wherein said mounting portion comprises a thin narrow elongated metal member extending from said base end portion; a gripable knob member having an enlarged oval shaped main portion that merges with a smaller cylindrical portion that is rotatably attached by a first threaded member to said outer end portion, said gripable member being adjustable to at least two positions relative to said outer end portion; said gripable knob member includes at least one face configured for alignment with at least one face of said outer end portion, said at least one face of said gripable member including one of a plurality of openings or a plurality of protrusions, said at least one face of said outer end portion includes one of a plurality of openings or a plurality of protrusions for cooperating with said at least one face of said gripable knob member, wherein said gripable knob member can be adjusted to at least two distinct positions relative to the support structure by aligning different combinations of said protrusions with said plurality of openings; and a second threaded member configured to engage said threaded through hole to contact said elongated member for removably securing said base end portion of the support structure to the foot structure.

12. A power tool configured to retain a cutting blade for reciprocating movement for cutting a work piece, said tool comprising: a tool body including a main handle for operating the tool; a flat bottom surfaced foot structure attached to said tool body as an integral part of the power tool for contacting the work piece and controlling the position of a cutting blade during operation of the tool, said foot structure having a front opening through which the cutting blade passes and side portions on opposite sides of the opening, the side portions each having a transverse channel for receiving a narrow flat elongated member, said foot structure having a threaded through hole above the channel for receiving a threaded knob for securing a narrow flat elongated member in the slot; a support structure having, a base end portion and an outer end portion extending upwardly from the foot structure, said base end portion comprising a mounting portion, wherein said mounting portion comprises a thin narrow elongated metal member extending from said base end portion; a gripable knob member having an enlarged oval shaped main portion that merges with a smaller cylindrical portion that is rotatably attached by a first threaded member to said outer end portion at two or more distinct positions that are determined by a set of holes in one of said outer end portion and said cylindrical portion and a set of protrusions in the other of said outer end portion and said cylindrical portion that fit within said holes; and a second threaded member configured to engage said threaded through hole to contact said elongated member for removably securing said base end portion of the support structure to the foot structure.

* * * * *

UNITED STATES PATENT AND TRADEMARK OFFICE
CERTIFICATE OF CORRECTION

PATENT NO. : 7,540,068 B2 Page 1 of 1
APPLICATION NO. : 11/170340
DATED : June 2, 2009
INVENTOR(S) : Powell et al.

It is certified that error appears in the above-identified patent and that said Letters Patent is hereby corrected as shown below:

In column 6, line 55, delete the following: "7".

Signed and Sealed this

Twentieth Day of October, 2009

David J. Kappos
*Director of the United States Patent and Trademark Office*